(12) United States Patent
Paul

(10) Patent No.: US 9,695,745 B2
(45) Date of Patent: Jul. 4, 2017

(54) CONNECTING ROD AND INTERNAL COMBUSTION ENGINE

(71) Applicant: Dr. Ing. h.c. F. Porsche Aktiengesellschaft, Stuttgart (DE)

(72) Inventor: Michael Paul, Weissach (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/040,054

(22) Filed: Feb. 10, 2016

(65) Prior Publication Data
US 2016/0258353 A1    Sep. 8, 2016

(30) Foreign Application Priority Data

Mar. 5, 2015    (DE) .......................... 10 2015 103 201

(51) Int. Cl.
*F02B 75/32* (2006.01)
*F02B 75/04* (2006.01)
(Continued)

(52) U.S. Cl.
CPC .............. *F02B 75/045* (2013.01); *F16C 7/06* (2013.01); *F16C 23/10* (2013.01); *F16J 7/00* (2013.01); *F16C 9/04* (2013.01); *F16C 2360/22* (2013.01)

(58) Field of Classification Search
CPC .. F02B 75/044; F02B 75/045; F04B 39/0292; F16C 7/06; F02D 15/02
See application file for complete search history.

(56) References Cited

U.S. PATENT DOCUMENTS 1,959,279 A * 5/1934 Stearns ................... F16C 7/023
                                                    184/6.5
2,232,170 A * 2/1941 Eynon ....................... F16C 9/04
                                                    123/196 R
(Continued)

FOREIGN PATENT DOCUMENTS

DE         101 08 461        8/2001
DE         10304686 A1 *     8/2004 ............ F02B 75/045
(Continued)

OTHER PUBLICATIONS

German Search Report of Jul. 10, 2015.

*Primary Examiner* — Marguerite McMahon
*Assistant Examiner* — Tea Holbrook
(74) *Attorney, Agent, or Firm* — Gerald E. Hespos; Michael J. Porco; Matthew T. Hespos

(57) ABSTRACT

A connecting rod (10) has a pin bearing eye connected to a crankshaft and a connecting rod bearing eye (12) connected to a piston. An eccentric adjusting device (13) adjusts an effective connecting rod length and has eccentric rods (15, 16) that act on an eccentric lever (14) of the adjusting device (13). The eccentric adjusting device (13) has an eccentric (36) guided in a recess of the lever (14) and a recess for receiving a gudgeon pin (37). Lubricating oil bores extend radially of the eccentric in the connecting rod bearing eye (12) and in the eccentric (36). Lubricating oil builds up via the lubricating oil bores between the connecting rod bearing eye (12) and the eccentric (36) and between the eccentric (36) and the gudgeon pin (37). Lubricating oil bores of the eccentric (36) are diametrically larger than lubricating oil bores of the connecting rod bearing eye (12).

7 Claims, 2 Drawing Sheets

(51) Int. Cl.
*F16C 7/06* (2006.01)
*F16C 23/10* (2006.01)
*F16J 7/00* (2006.01)
*F16C 9/04* (2006.01)

(56) References Cited

U.S. PATENT DOCUMENTS

| | | | | |
|---|---|---|---|---|
| 2,362,158 A * | 11/1944 | Ricardo | ............... | F01M 1/06 123/41.38 |
| 2,741,519 A * | 4/1956 | Meurer | ............... | F01M 1/06 123/263 |
| 3,056,638 A * | 10/1962 | Hovde | ............... | F16J 1/14 123/193.6 |
| 3,656,412 A * | 4/1972 | Wilson | ............... | F02B 75/044 123/48 B |
| 4,142,484 A * | 3/1979 | Buhl | ............... | F01M 1/06 123/193.6 |
| 5,039,285 A * | 8/1991 | Lindstrom | ............... | F01M 1/08 184/6.8 |
| 5,118,263 A * | 6/1992 | Fritchman | ............... | F04B 39/0292 184/18 |
| 5,845,611 A * | 12/1998 | Schmidt | ............... | F02F 3/22 123/41.35 |
| 6,250,275 B1 * | 6/2001 | Bock | ............... | F01M 1/08 123/196 R |
| 6,386,153 B1 * | 5/2002 | Rao | ............... | F02B 75/045 123/48 B |
| 6,907,848 B2 * | 6/2005 | Beardmore | ............... | F01M 1/06 123/41.35 |
| 7,624,672 B2 * | 12/2009 | Sawada | ............... | F02F 3/00 92/157 |
| 2003/0075125 A1 * | 4/2003 | Kreuter | ............... | F02B 75/048 123/78 BA |
| 2009/0107467 A1 * | 4/2009 | Berger | ............... | F02D 15/04 123/48 B |
| 2014/0216427 A1 * | 8/2014 | Yan | ............... | F02B 75/044 123/78 B |
| 2015/0260094 A1 | 9/2015 | Wittek | | |
| 2015/0300272 A1 * | 10/2015 | Pluta | ............... | F02B 75/045 123/48 R |

FOREIGN PATENT DOCUMENTS

| | | | | |
|---|---|---|---|---|
| DE | 10 2005 055 199 | | 5/2007 | |
| DE | 102005055199 A1 * | | 5/2007 | ............ F02B 75/045 |
| DE | 10 2010 016 037 | | 9/2011 | |
| DE | 102010061361 A1 * | | 4/2012 | ............ F02D 15/02 |
| DE | 102010061362 A1 * | | 6/2012 | ............ F02B 75/045 |
| DE | 102011002138 A1 * | | 10/2012 | ............ F02B 75/045 |
| JP | EP 0219634 A2 * | | 4/1987 | ............ F02B 41/04 |
| JP | WO 2014203618 A1 * | | 12/2014 | ............ F02B 75/32 |
| WO | 2014/019683 | | 2/2014 | |

* cited by examiner

CONNECTING ROD AND INTERNAL COMBUSTION ENGINE

CROSS REFERENCE TO RELATED APPLICATION

This application claims priority under 35 USC 119 to German Patent Appl. No. 10 2015 103 201.5 filed on Mar. 5, 2015, the entire disclosure of which is incorporated herein by reference.

BACKGROUND

1. Field of the Invention

The invention relates to a connecting rod for an internal combustion engine and to an internal combustion engine.

2. Description of the Related Art

DE 10 2010 016 037 A1 and FIG. 1 herein show a connecting rod of an internal combustion engine having an adjustable compression ratio. The connecting rod 10 has a pin bearing eye 11 and a connecting rod bearing eye 12. The pin bearing eye 11 connects the connecting rod 10 to a crankshaft (not shown in FIG. 1) and the connecting rod bearing eye 12 connects the connecting rod 10 to a cylinder piston (not shown in FIG. 1) of the internal combustion engine. The connecting rod 10 is assigned an eccentric adjusting device 13 that has an eccentric (not shown in FIG. 1), an eccentric lever 14 and eccentric rods 15, 16. The eccentric lever 14 has a recess that is arranged eccentrically with respect to a center point 17 of the connecting rod bearing eye 12 and has a center point 18. The recess in the eccentric lever 14 receives the eccentric and a recess in the eccentric receives a gudgeon pin. The eccentric adjusting device 13 functions to adjust an effective connecting rod length $l_{eff}$. The spacing of the center point 18 of the recess in the eccentric lever 14 from a center point 19 of the pin bearing eye 11 is understood to be the connecting rod length. The eccentric rods 15, 16 can be moved to rotate the eccentric body 14 and therefore to change the effective connecting rod length $l_{eff}$. Each eccentric rod 15, 16 is assigned a piston 20, 21 that is guided displaceably in a hydraulic chamber 22, 23. A hydraulic pressure that acts on the pistons 20, 21 that are assigned to the eccentric rods 15, 16 prevails in the hydraulic chambers 22, 23. The movement of the eccentric rods 15, 16 is possible or not possible depending on the oil quantity in the hydraulic chambers.

The adjustment of the eccentric adjusting device 13 is initiated by the action of mass and load forces of the internal combustion engine that act on the eccentric adjusting device 13 during a work stroke of the internal combustion engine. The directions of action of the forces that act on the eccentric adjusting device 13 change continuously during a work stroke. The adjusting movement is assisted by the pistons 20, 21 that are loaded with hydraulic oil and act on the eccentric rods 15, 16. The pistons 20, 21 prevent restoring the eccentric adjusting device 13 on account of varying directions of force action of the forces that act on the eccentric adjusting device 13. The eccentric rods 15, 16 are connected on both sides to the eccentric body 14 and interact with the pistons 20, 21. The pistons 20, 21 are guided in the hydraulic chambers 22 and 23, and the hydraulic chambers 22 and 23 can be loaded with hydraulic oil from the pin bearing eye 11 via hydraulic oil lines 24 and 25. Check valves 26 and 27 prevent a return flow of the hydraulic oil from the hydraulic chambers 23 and 24 back into the hydraulic lines 24 and 25. A switchover valve 29 is received in a bore 28 of the connecting rod 10. The switching position of the switchover valve 29 determines which of the hydraulic chambers 22 and 23 is filled with hydraulic oil and which is emptied, with the adjusting or rotational direction of the eccentric adjusting device 13 depending on this. Fluid lines 30 and 31 contact with the hydraulic chambers 22 and 23, which, in turn, are in contact via with the bore 28 that receives the switchover valve 29. In FIG. 1, an actuating means 32, a spring device 33 and a control piston 34 of the switchover valve 29 are shown diagrammatically, and function substantially as described in DE 10 2010 016 037 A1.

As described above, the hydraulic oil acts on the pistons 20, 21 that are guided in the hydraulic chambers 22, 23 and is fed to the hydraulic chambers 22, 23 via hydraulic lines 24 and 25, starting from the pin bearing eye 11. The connecting rod 10 acts by way of the pin bearing eye 11 on the crankshaft (not shown in FIG. 1) so that a connecting rod bearing shell 35 is arranged between a crankshaft bearing journal of the crankshaft, and the pin bearing eye.

DE 101 08 461 B4 discloses a crankshaft bearing for an internal combustion engine having an adjustable compression ratio. The crankshaft is mounted in eccentric rings in the crankshaft bearing. The eccentric ring in the crankshaft bearing has a circumferential oil distribution groove on its outer circumferential face. Oil can pass in the direction of the oil distribution groove via an oil feed channel in the engine housing.

It is an object of the invention to provide a novel internal combustion engine and a novel connecting rod.

SUMMARY

Lubricating oil bores are made in the connecting rod bearing eye and in the eccentric and extend in the radial direction of the eccentric and the connecting rod bearing eye. The lubricating oil bores enable a lubricating oil film to be built up first between the connecting rod bearing eye and the eccentric, and second between the eccentric and the gudgeon pin. Each lubricating oil bore of the eccentric has a greater diameter than each lubricating oil bore of the connecting rod bearing eye.

The invention permits advantageous lubrication of the contact points between the connecting rod and the eccentric and between the eccentric and the gudgeon pin. A lubricating oil reservoir for the lubrication between the eccentric and the gudgeon pin is provided by the greater diameter of each lubricating oil bore of the eccentric.

In the first end position of the eccentric, a first lubricating oil bore extends in the radial direction of the eccentric, and a first lubricating oil bore extends in the radial direction of the connecting rod bearing eye and has a smaller diameter than the first lubricating oil bore of the eccentric. The first lubricating oil bores of the eccentric and the connecting rod bearing eye lie behind one another in the radial direction, so that a lubricating oil film can build up between the eccentric and the gudgeon pin via the lubricating oil bores in the first end position. In a second end position of the eccentric, a second lubricating oil bore extends in the radial direction of the eccentric and a second lubricating oil bore extends in the radial direction of the connecting rod bearing eye and has a smaller diameter than the second lubricating oil bore of the eccentric. The second lubricating oil bores of the eccentric and the connecting rod bearing eye lie behind one another in the radial direction, so that a lubricating oil film can be built up between the eccentric and the gudgeon pin via the lubricating oil bores in the second end position. The second lubricating oil bore of the eccentric and the second lubricating oil bore of the connecting rod bearing eye preferably do not lie radially behind one another in the first end position. As a result, a lubricating oil film can build up between the connecting rod bearing eye and the eccentric via the second lubricating oil bore of the connecting rod bearing eye in the first end position. Similarly, the first lubricating oil bore of the eccentric and the first lubricating oil bore of the connecting rod bearing eye do not lie radially behind one another in the second end position of the eccentric. As a result, a lubricating oil film can be built up between the connecting rod bearing eye and the eccentric via the first lubricating oil bore of the connecting rod bearing eye in the second end position. This configuration of the lubricating oil bores allows satisfactory lubrication of the relevant contact points in the end positions of the eccentric adjusting device and during the adjustment thereof.

The lubricating oil bores of the eccentric may be offset axially or displaced with respect to the lubricating oil bores of the connecting rod bearing eye in such a way that, in the first end position of the eccentric, axes of the first lubricating oil bore of the eccentric and of the first lubricating oil bore of the connecting rod bearing eye do not coincide. In the second end position of the eccentric, axes of the second lubricating oil bore of the eccentric and of the second lubricating oil bore of the connecting rod bearing eye do not coincide but rather are offset in the circumferential direction of the eccentric and the connecting rod bearing eye. As a result of said axial offset, a reliable oil supply of the respective lubricating oil reservoir can be ensured in the case of micromovements of the eccentric in its respective end position.

Exemplary embodiments of the invention will be explained in greater detail using the drawing, without being restricted thereto.

DETAILED DESCRIPTION

Figure 1:
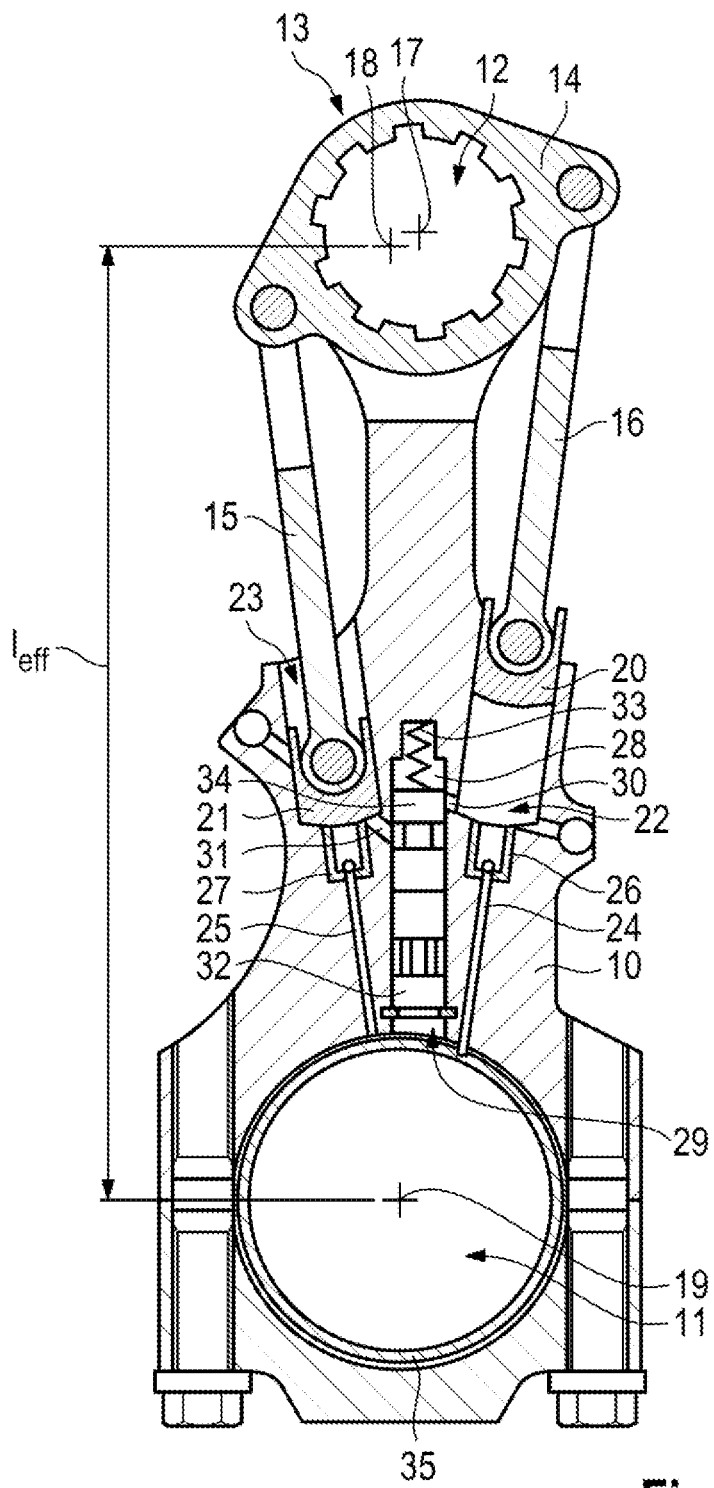
FIG. 1 shows a connecting rod of an internal combustion engine known from the prior art with an adjustable compression ratio.

An internal combustion engine having an adjustable compression ratio has at least one, preferably a plurality of cylinders. Each cylinder has a piston that is coupled via a connecting rod 10 to a crankshaft of the internal combustion engine. Each connecting rod 10 has a connecting rod bearing eye 12 at one end and a pin bearing eye 11 at an opposite end. The respective connecting rod 10 acts with its pin bearing eye 11 on a crankshaft bearing journal of the crankshaft with a connecting rod bearing shell positioned between the crankshaft bearing journal and the pin bearing eye. A lubricating oil film can be built up between the connecting rod bearing shell and the crankshaft bearing journal.

An internal combustion engine having an adjustable compression ratio has an eccentric adjusting device 13 in the region of each connecting rod 10 for adjusting the effective length of the respective connecting rod 10. The eccentric adjusting device 13 has an eccentric 36, an eccentric lever 14 and eccentric rods 15, 16 that can be moved to set the compression ratio depending on a hydraulic pressure that prevails in hydraulic chambers that interact with the eccentric rods. The hydraulic chambers that interact with the eccentric rods 15, 16 can be supplied with hydraulic oil starting from the pin bearing eye 11 of the respective connecting rod. The adjustment of the eccentric adjusting device is initiated by the action of mass and load forces of the internal combustion engine.

The eccentric lever 14 has a bore or recess for receiving the eccentric 36, and the eccentric 36 has a bore or recess that can receive a gudgeon pin 37. Lubricating oil bores 38, 39 and 40, 41 are made in the connecting rod bearing eye 12 and in the eccentric 36 and enable a lubricating oil film to be built up first between the connecting rod bearing eye 12 and the eccentric 36 and second between the eccentric 36 and the gudgeon pin 37. The lubricating oil bores 38, 39, 40, 41 allow satisfactory lubrication of the contact points between the connecting rod bearing eye 12 and the eccentric 36 and between the eccentric 36 and the gudgeon pin 37 in the end positions of the eccentric adjusting device 13 and during the adjustment of the eccentric adjusting device 13.

Figure 2:
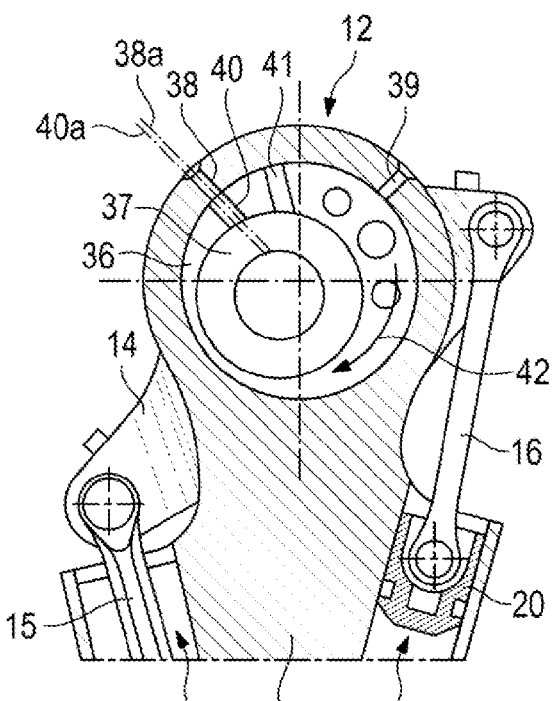
FIG. 2 shows a detail of a connecting rod according to the invention with an adjustable compression ratio in a first state.
Figure 3:
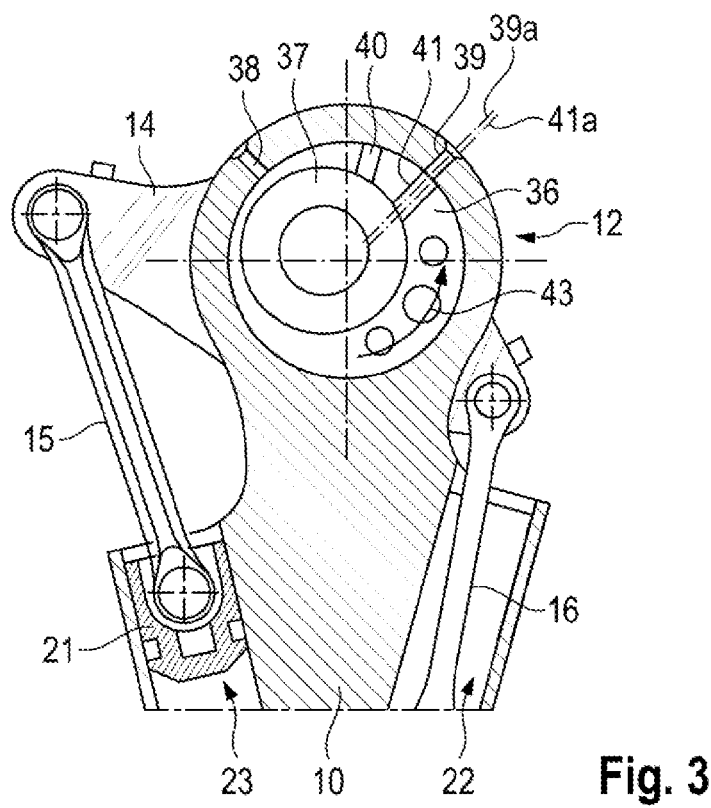
FIG. 3 shows the detail from FIG. 2 in a second state.

In the embodiment shown in FIGS. 2 and 3, two lubricating oil bores 38, 39 are made in the connecting rod bearing eye 12 and two lubricating oil bores 40, 41 are made in the eccentric 36. The lubricating oil bores 38, 39, 40, 41 are made in the connecting rod bearing eye 12 and in the eccentric 36 in such a way that, in a first end position of the eccentric 36 or the eccentric adjusting device 13, a first lubricating oil bore 40 of the eccentric 36 and a first lubricating oil bore 38 of the connecting rod bearing eye 12 lie behind one another in the radial direction of the eccentric or connecting rod bearing eye. As a result, a lubricating oil film can be built up between the eccentric 36 and the gudgeon pin 37 via said lubricating oil bores 40, 38 in the first end position (see FIG. 2). The lubricating oil bores 38, 39, 40, 41 are made in the connecting rod bearing eye 12 and in the eccentric 36 so that in a second end position of the eccentric 36, a second lubricating oil bore 41 of the eccentric 36 and a second lubricating oil bore 39 of the connecting rod bearing eye 12 lie behind one another in the radial direction (see FIG. 3). As a result, a lubricating oil film can be built up between the eccentric 36 and the gudgeon pin 37 via said lubricating oil bores 41, 39 in the second end position.

In the first end position of the eccentric 36 or the eccentric adjusting device 13 (see FIG. 2), the second lubricating oil bore 41 of the eccentric 36 and the second lubricating oil bore 39 of the connecting rod bearing eye 12 do not lie behind one another in the radial direction of the eccentric and connecting rod bearing eye. As a result, a lubricating oil film can be built up between the connecting rod bearing eye 12 and the eccentric 36 via the second lubricating oil bore 39 of the connecting rod bearing eye 12 in the first end position. In the second end position of the eccentric 36 or the eccentric adjusting device 13 (see FIG. 3), the first lubricating oil bore 40 of the eccentric 36 and the first lubricating oil bore 38 of the connecting rod bearing eye 12 do not lie behind one another in the radial direction of the eccentric and the connecting rod bearing eye. As a result, a lubricating oil film can then be built up between the connecting rod bearing eye 12 and the eccentric 36 via the first lubricating oil bore 38 of the connecting rod bearing eye 12 in the second end position.

The lubricating oil bores 38, 39 in the connecting rod bearing eye 12 and the lubricating oil bores 40, 41 in the eccentric 36 extend in each case in the radial direction of the eccentric 36 and in the radial direction of the connecting rod bearing eye 12.

The lubricating oil bores 40, 41 of the eccentric 36 have a greater diameter than the lubricating oil bores 38, 39 of the connecting rod bearing eye 12. The first lubricating oil bore 40 of the eccentric 36 thus has a greater diameter than the first lubricating oil bore 38 of the connecting rod bearing eye 12, and the second lubricating oil bore 41 of the eccentric 36 has a greater diameter than the second lubricating oil bore 39 of the connecting rod bearing eye 12.

A lubricating oil reservoir for the lubrication between the eccentric 36 and the gudgeon pin 37 is provided by way of the greater diameter of the lubricating oil bores 40, 41 of the eccentric 36. Weakening of the connecting rod bearing eye 12 is avoided and sufficient lubricating oil is provided for the lubrication of the gudgeon pin 37.

Furthermore, the lubricating oil bores 40, 41 of the eccentric 36 are axially offset or displaced with respect to the lubricating oil bores 38, 39 of the connecting rod bearing eye 12 so that, in the first end position of the eccentric 36 (see FIG. 2), axes 40a, 38a of the first lubricating oil bore 40 of the eccentric 36 and of the first lubricating oil bore 38 of the connecting rod bearing eye 12 and, in the second end position of the eccentric 36 (see FIG. 3), axes 41a, 39a of the second lubricating oil bore 41 of the eccentric 36 and of the second lubricating oil bore 39 of the connecting rod bearing eye 12 do not coincide, but rather are offset in the circumferential direction of the eccentric 36 and the connecting rod bearing eye 12. As a result of said axial offset of the lubricating oil bores 38, 40 and 39, 41 in the respective end position of the eccentric 36, a reliable oil supply from the respective lubricating oil reservoir can be ensured in the case of micromovements of the eccentric 36 in its respective end position. The axial offset or displacement of the respective lubricating oil bore 40, 41 of the eccentric 36 with respect to the respective lubricating oil bore 38, 39 of the connecting rod bearing eye 12 in an end position of the eccentric 36 is in an opposite direction to the displacement direction of the eccentric 36 out of the end position in the direction of the other end position. This can be gathered from the relative position of the axes 38a, 40a in FIG. 2 and the relative position of the axes 39a, 41a in FIG. 3.

According to FIG. 2, the axis 40a of the first lubricating oil bore 40 of the eccentric 36 is behind the axis 38a of the first lubricating oil bore 38 of the connecting rod bearing eye 12 in the first end position of the eccentric 36 or the eccentric adjusting device 13, in relation to the displacement direction (arrow 42) of the eccentric 36 toward the second end position thereof. As viewed in the displacement direction of the eccentric 36 shown by the arrow 42, front edges of the first lubricating oil bores 38, 40 of the eccentric 36 and the connecting rod bearing eye 12 lie on a circumferential position in the first end position of the eccentric 36, whereas a rear edge of the lubricating oil bore 40 of the eccentric 36 is recessed with respect to a rear edge of the lubricating oil bore 38 of the connecting rod bearing eye 12 in the displacement direction of the eccentric 36 (arrow 42).

According to FIG. 3, the axis 41a of the second lubricating oil bore 41 of the eccentric 36 is behind the axis 39a of the second lubricating oil bore 39 of the connecting rod bearing eye 12 in the second end position of the eccentric 36 or the eccentric adjusting device 13, in relation to the displacement direction of the eccentric 36 shown by the arrow 43 in the direction of the first end position. As viewed in the displacement direction of the eccentric 36 shown by the arrow 43, front edges of the second lubricating oil bores 39, 41 of the eccentric 36 and the connecting rod bearing eye 12 lie on a circumferential position in the second end position of the eccentric 36, whereas a rear edge of the lubricating oil bore 41 of the eccentric 36 is recessed with respect to a rear edge of the lubricating oil bore 39 of the connecting rod bearing eye 12 in the displacement direction of the eccentric 36 shown by the arrow 43.

An internal combustion engine according to the invention has an adjustable compression ratio, a plurality of cylinders, and a crankshaft, on which each cylinder acts via a connecting rod 10 as described above.

What is claimed is:

1. A connecting rod, comprising: a pin bearing eye for connecting to a crankshaft and a connecting rod bearing eye for connecting to a piston of a cylinder, and an eccentric adjusting device for adjusting an effective connecting rod length, the eccentric adjusting device having eccentric rods that act on an eccentric lever of the eccentric adjusting device, the eccentric adjusting device having an eccentric that is guided in a bore or recess of the eccentric lever and that has a bore or recess for receiving a gudgeon pin, lubricating oil bores made in the connecting rod bearing eye and in the eccentric and extending in a radial direction of the eccentric and the connecting rod bearing eye, the lubricating oil bores enabling a lubricating oil film to be built up between the connecting rod bearing eye and the eccentric and between the eccentric and the gudgeon pin, each lubricating oil bore of the eccentric having a diameter D that is sufficiently greater than a diameter d of each lubricating oil bore of the connecting rod bearing eye so that $2d \geq D > d$.

2. The connecting rod of claim 1, wherein in a first end position of the eccentric, a first lubricating oil bore of said eccentric and a first lubricating oil bore of the connecting rod bearing eye lie behind one another in the radial direction and, in a second end position of the eccentric, a second lubricating oil bore of said eccentric and a second lubricating oil bore of the connecting rod bearing eye lie behind one another in the radial direction so that a lubricating oil film can be built up between the eccentric and the gudgeon pin via the lubricating oil bores in the respective end position.

3. The connecting rod of claim 2, wherein, in the first end position of the eccentric, the second lubricating oil bore of the eccentric and the second lubricating oil bore of the connecting rod bearing eye do not lie behind one another in the radial direction so that a lubricating oil film can be built up between the connecting rod bearing eye and the eccentric via the second lubricating oil bore of the connecting rod bearing eye in the first end position, and in the second end position of the eccentric, the first lubricating oil bore of the eccentric and the first lubricating oil bore of the connecting rod bearing eye do not lie behind one another in the radial direction so that a lubricating oil film can be built up between the connecting rod bearing eye and the eccentric via the first lubricating oil bore of the connecting rod bearing eye in the second end position.

4. The connecting rod of claim 3, wherein the lubricating oil bores of the eccentric are displaced with respect to the lubricating oil bores of the connecting rod bearing eye so that, in the first end position of the eccentric, axes of the first lubricating oil bore of the eccentric and the first lubricating oil bore of the connecting rod bearing eye are offset circumferentially and, in a second end position of the eccentric, axes of the second lubricating oil bore of the eccentric and the second lubricating oil bore of the connecting rod bearing eye are offset in the circumferential direction of the eccentric and the connecting rod bearing eye.

5. The connecting rod of claim 4, wherein, in the first end position, the displacement of the respective lubricating oil bore of the eccentric with respect to the respective lubricating oil bore of the connecting rod bearing eye is counter to an adjusting direction toward the second end position, and in the second end position, the displacement of the respective lubricating oil bore of the eccentric with respect to the respective lubricating oil bore of the connecting rod bearing eye is counter to an adjusting direction toward the first end position.

6. An internal combustion engine that has an adjustable compression ratio, having at least one cylinder and a crankshaft on which the connecting rod of claim 1.

7. A connecting rod, comprising:
- a pin bearing eye for connecting to a crankshaft;
- a connecting rod bearing eye for connecting to a piston of a cylinder, first and second connecting rod lubricating oil bores formed in the connecting rod bearing eye and extending in a radial direction of the connecting rod bearing eye, each of the connecting rod lubricating oil bores having a diameter d;
- an eccentric adjusting device for adjusting an effective connecting rod length, the eccentric adjusting device having eccentric rods that act on an eccentric lever of the eccentric adjusting device, the eccentric adjusting device having an eccentric that is guided in a bore or recess of the eccentric lever and that has a bore or recess for receiving a gudgeon pin, first and second eccentric lubricating oil bores formed in the eccentric and extending in a radial direction of the connecting rod bearing eye, each eccentric lubricating oil bore having a diameter D selected relative to the diameter d of each of the connecting rod lubricating oil bores so that $2d \geq D > d$, wherein in a first end position of the eccentric, the first eccentric lubricating oil bore and the first lubricating oil bore radially overlap with the first eccentric lubricating oil bore extending to a side of the first connecting rod lubricating oil bore remote from the second lubricating oil bore, while the second eccentric lubricating oil bore and the second lubricating oil bore are not aligned in a second end position of the eccentric, the second eccentric lubricating oil bore and the second lubricating oil bore radially overlap with the second eccentric lubricating oil bore extending to a side of the second connecting rod lubricating oil bore remote from the first lubricating oil bore, while the first eccentric lubricating oil bore and the first lubricating oil bore are not aligned, and the lubricating oil bores enable a lubricating oil film between the connecting rod bearing eye and the eccentric and between the eccentric and the gudgeon pin.

\* \* \* \* \*